United States Patent
Moreton et al.

(10) Patent No.: US 6,624,811 B1
(45) Date of Patent: Sep. 23, 2003

(54) SYSTEM, METHOD AND ARTICLE OF MANUFACTURE FOR DECOMPOSING SURFACES USING GUARD CURVES AND REVERSED STITCHING

(75) Inventors: Henry P. Moreton, Woodside, CA (US); Justin Legakis, Davis, CA (US)

(73) Assignee: NVIDIA Corporation, Santa Clara, CA (US)

(*) Notice: Subject to any disclaimer, the term of this patent is extended or adjusted under 35 U.S.C. 154(b) by 259 days.

(21) Appl. No.: 09/652,866

(22) Filed: Aug. 31, 2000

(65) Prior Publication Data

(65)

(51) Int. Cl.$^7$ ................................................ G06T 17/20
(52) U.S. Cl. ...................................... 345/423; 345/611
(58) Field of Search ................................ 345/423, 611

(56) References Cited

U.S. PATENT DOCUMENTS

| | | | | | |
|---|---|---|---|---|---|
| 4,912,659 A | * | 3/1990 | Liang | ................... | 345/505 |
| 5,283,860 A | * | 2/1994 | Einkauf et al. | ............. | 345/624 |
| 5,363,478 A | * | 11/1994 | Fiasconaro | .............. | 345/441 |
| 5,377,320 A | * | 12/1994 | Abi-Ezzi et al. | ............ | 345/502 |
| 5,428,718 A | * | 6/1995 | Peterson et al. | ............ | 345/423 |
| 5,488,684 A | * | 1/1996 | Gharachorloo et al. | ..... | 345/423 |

OTHER PUBLICATIONS

Article "Towards Hardware Implementation of Loop Subdivision" by Stephan Bischoff et al. Proceedings 2000 SIGGRAPH/EUROGRAPHICS workshop on Graphics hardware Aug. 2000. Publisher ACM Press pp.:41–50 Series–Proceeding–Article.*

Article "Drawing Antialiased Cubic Spline Curves" Author R. Victor Klassen Xerox Corp., Webster, NY Publisher ACm Press New York, NY, USA pp.: 92–108 Periodical–Issue–Article Year of Publication: 1991 ISSN:0730–0301.*

* cited by examiner

Primary Examiner—Mark Zimmerman
Assistant Examiner—Enrique L Santiago
(74) Attorney, Agent, or Firm—Silicon Valley IP Group; Kevin J. Zilka

(57) ABSTRACT

A system, method and article of manufacture are provided for decomposing surfaces using guard curves for rendering purposes during computer graphics processing. Initially, a patch is received. Thereafter, a plurality of strip curves associated with the patch is defined in a first predetermined direction. As such, areas are defined by the strip curves which are adapted for being decomposed into a plurality of primitives. Next, at least one guard curve associated with the patch is generated. The guard curve is positioned along ends of the strip curves and in a second predetermined direction perpendicular with respect to the first predetermined direction.

19 Claims, 10 Drawing Sheets

SYSTEM, METHOD AND ARTICLE OF MANUFACTURE FOR DECOMPOSING SURFACES USING GUARD CURVES AND REVERSED STITCHING

FIELD OF THE INVENTION

The present invention relates to computer graphics, and more particularly to constructing primitives for rendering purposes in a computer graphics pipeline.

BACKGROUND OF THE INVENTION

In computer graphic systems, rendering and displaying three-dimensional graphics typically involves many calculations and computations. For example, to render a three dimensional object, a set of coordinate points or vertices that define a surface to be rendered must be formed. Vertices can be joined to form polygons, or primitives, that define the surface of the object to be rendered and displayed.

Tessellation refers to the process of decomposing the surface into simpler primitives such as triangles or quadrilaterals. The desired size of each primitive may be determined by the transformation of the representation to screen space. Prior Art FIG. 1 illustrates the results of one example of a representative conventional tessellation, or decomposition, process on a surface 100. First, a plurality of parallel, equally spaced strip curves 102 are defined in the parameter space of the surface. Such strip curves 102 span a width of the surface 100 and coincide with a plurality of vertices 104. Strip curves 102 simply refer to any line or curve connecting a plurality of vertices 104. Thereafter, during an evaluation process, the vertices 104 of adjacent strip curves 102 are connected in a sequential order from one side of the surface to an opposite side. Resulting is a tessellation or group, of a plurality of equally or roughly parametrically sized primitives, i.e. triangles, that are ready to be rendered.

There are numerous evaluation techniques for evaluating a surface in the foregoing manner. Such evaluation techniques include, but are not limited to Homer's Method, De Casteljau, knot insertion, and forward differencing. Prior Art FIG. 2 illustrates an example of the method associated with forward differencing.

Forward differencing is an efficient technique for the evaluation of a polynomial. As shown in Prior Art FIG. 2, the forward differencing of a cubic polynomial is illustrated. The bottom row of circles represents values of the polynomial at equally spaced parameters. The second row represents those values that when added to the first row of values steps the polynomial to the next circle. For a cubic polynomial, the top row of circles, labeled p''', contain an unchanging constant. Because the top row is constant, the evaluation can start with the first column of four values and derive each subsequent column by performing three additions. One drawback of the use of such forward differencing is the accumulation of round-off error.

Complications arise when using the above forward differencing technique to evaluate adjacent patches, as shown in Prior Art FIG. 1 Such problems particularly arise when the adjacent patches have a rotated orientation. As shown, when evaluating an area adjacent to an adjoining strip curve 105 between the patches, the value of points 106 along the strip curve 105 may differ from the corresponding values resulting from evaluation of the strip curves 102 of the adjacent patch. In other words, a problem exists in getting the right edge of the left-hand patch 108 to match the strip curve along the left edge of the right-hand patch 110. The values along the right edge of the left-hand patch 108 are the result of a long series of additions with rounding errors. The values along the corresponding left edge of the right-hand patch 110 are the result of a different series of additions along a single strip curve. Even if these operations are performed in the same floating-point engine, the resulting values and positions do not match. Unfortunately, as a general rule, it is not possible to reorient the patches to avoid this complication which, in turn, results in rendering artifacts in the form of pixel dropouts, double hits and/or cracking.

There is thus a need for a process of evaluating adjacent patches such that the values are consistent, thus avoiding rendering artifacts.

DISCLOSURE OF THE INVENTION

A system, method and article of manufacture are provided for decomposing surfaces using guard curves for rendering purposes during computer graphics processing. Initially, a patch is received. Thereafter, a plurality of strip curves associated with the patch is defined in a first predetermined direction. As such, areas are defined by the strip curves which are adapted for being decomposed into a plurality of primitives. Next, at least one guard curve associated with the patch is generated. The guard curve is positioned along ends of the strips curves and in a second predetermined direction perpendicular with respect to the first predetermined direction in parameter space. Such guard curve is thus adapted to be determined consistent with curves on edges/boundaries of adjacent patches.

In use, the guard curve prevents vertex mismatches when tessellating adjacent curved surfaces into triangles. In particular, the guard curve ensures decomposition of the patch consistent with a curve of an adjacent patch. As an option, the areas defined by the strip curves may be adapted for being decomposed into a plurality of primitives using forward differencing.

In one embodiment of the present invention, a reversed strip curve may be generated in a third predetermined direction parallel and opposite with respect to the first predetermined direction. An area defined by one of the strip curves in the first predetermined direction and the reversed strip curve may then be tessellated using reverse stitching.

In one aspect of the present invention, a plurality of guard curves are generated, and a distance between the guard curves is determined based on a size of a vertex memory into which vertices of the primitives are loaded. As an option, a length of the guard curve is also determined based on the size of the vertex memory into which vertices of the primitives are loaded. Still yet, the guard curve may include position values, normal values, or any other vertex components such as color or texture coordinates.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

Prior Art

Prior Art

DESCRIPTION OF THE PREFERRED EMBODIMENTS

Figure 1:
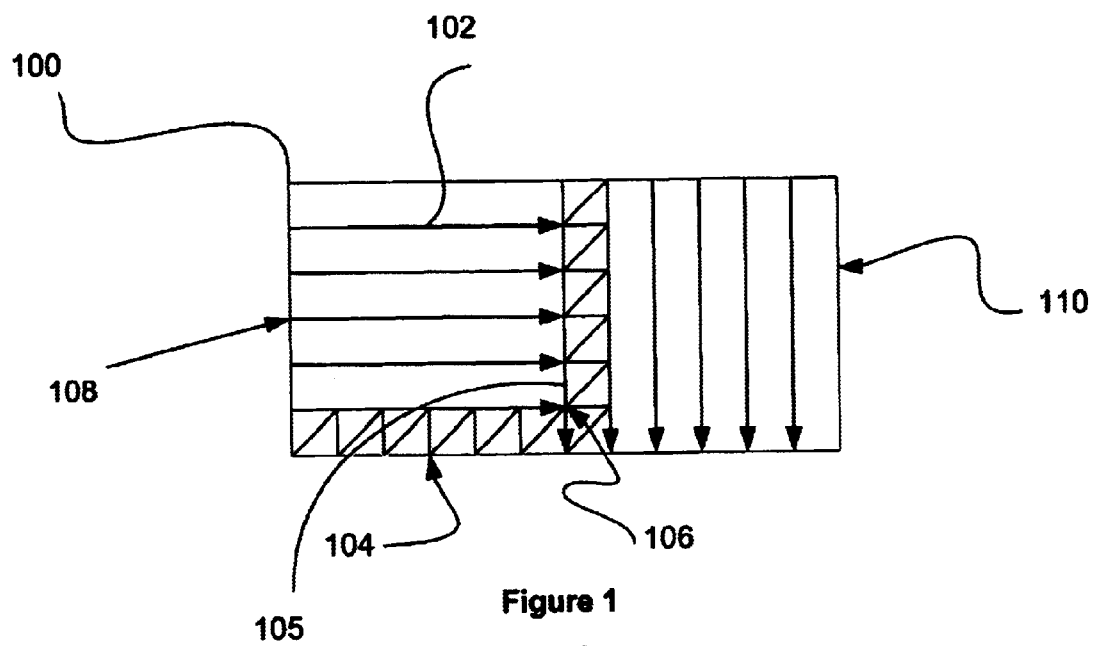
FIG. 1 illustrates the results of a representative conventional tessellation, or decomposition, process on a surface during computer graphics processing.
Figure 2:
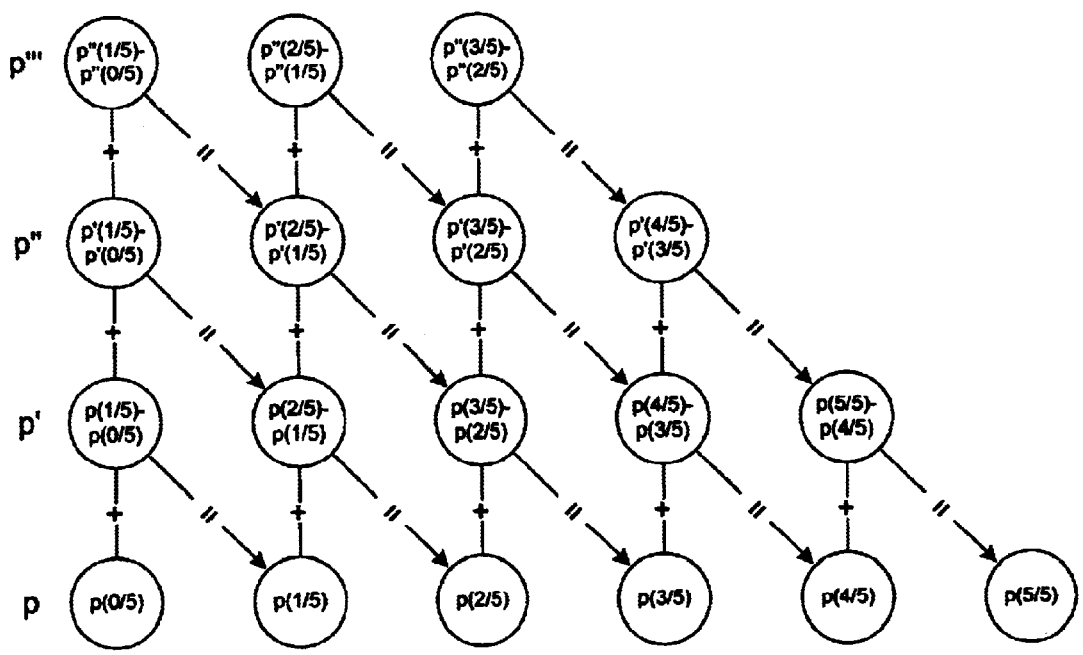
FIG. 2 illustrates an example of a conventional forward differencing procedure.
Figure 3:
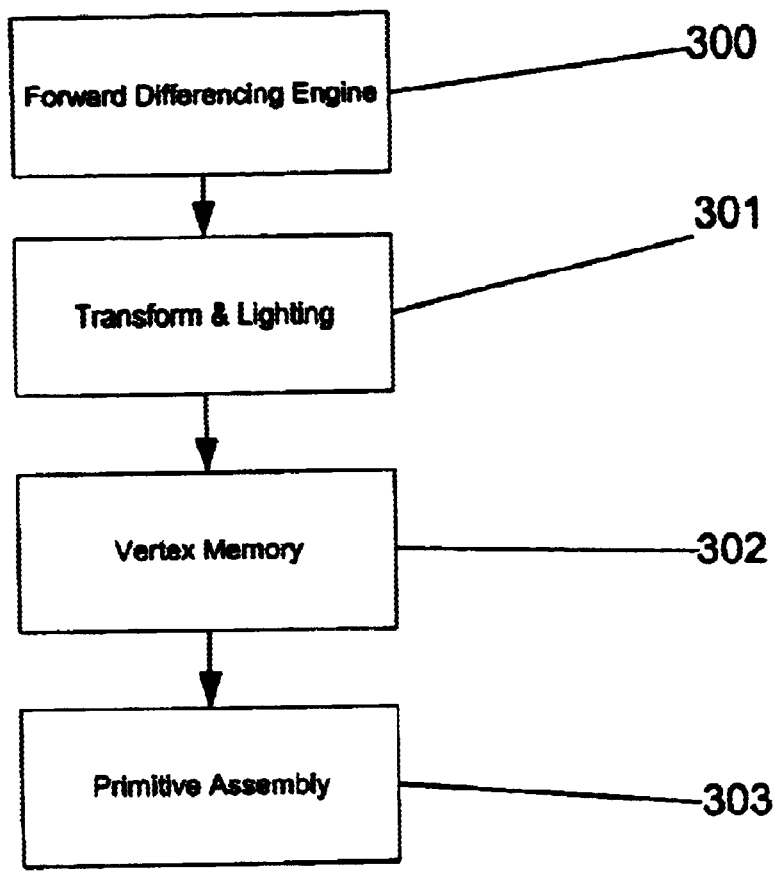
FIG. 3 is a general schematic of an exemplary hardware implementation in accordance with one embodiment of the present invention.

FIGS. 1 and 2 illustrate prior art computer graphics tessellation techniques. FIG. 3 is a general schematic of an exemplary hardware implementation of the present invention. As shown, a forward differencing engine 300 is included for tessellating patches for the purpose of defining primitives. Coupled to the forward differencing engine 300 is a transform and lighting module 301 which is adapted to perform scaling, rotation, and projection of a set of three dimensional vertices of the primitives. The transform and lighting module 301 also sets the color and appearance of the vertices of the primitives based on various lighting schemes, light locations, ambient light levels, materials, and so forth.

A vertex memory 302 is coupled to the transform and lighting module 301 for storing vertices of the primitives that have been processed by the transform and lighting module 301. As is well known to those of ordinary skill, the vertex memory 302 enables reuse of calculated or transformed vertices in order to afford accelerated operation. Coupled to the vertex memory 302 is a primitive assembly unit 303 that assembles the primitives in preparation for a rendering using a rasterizer (not shown).

Figure 3A:
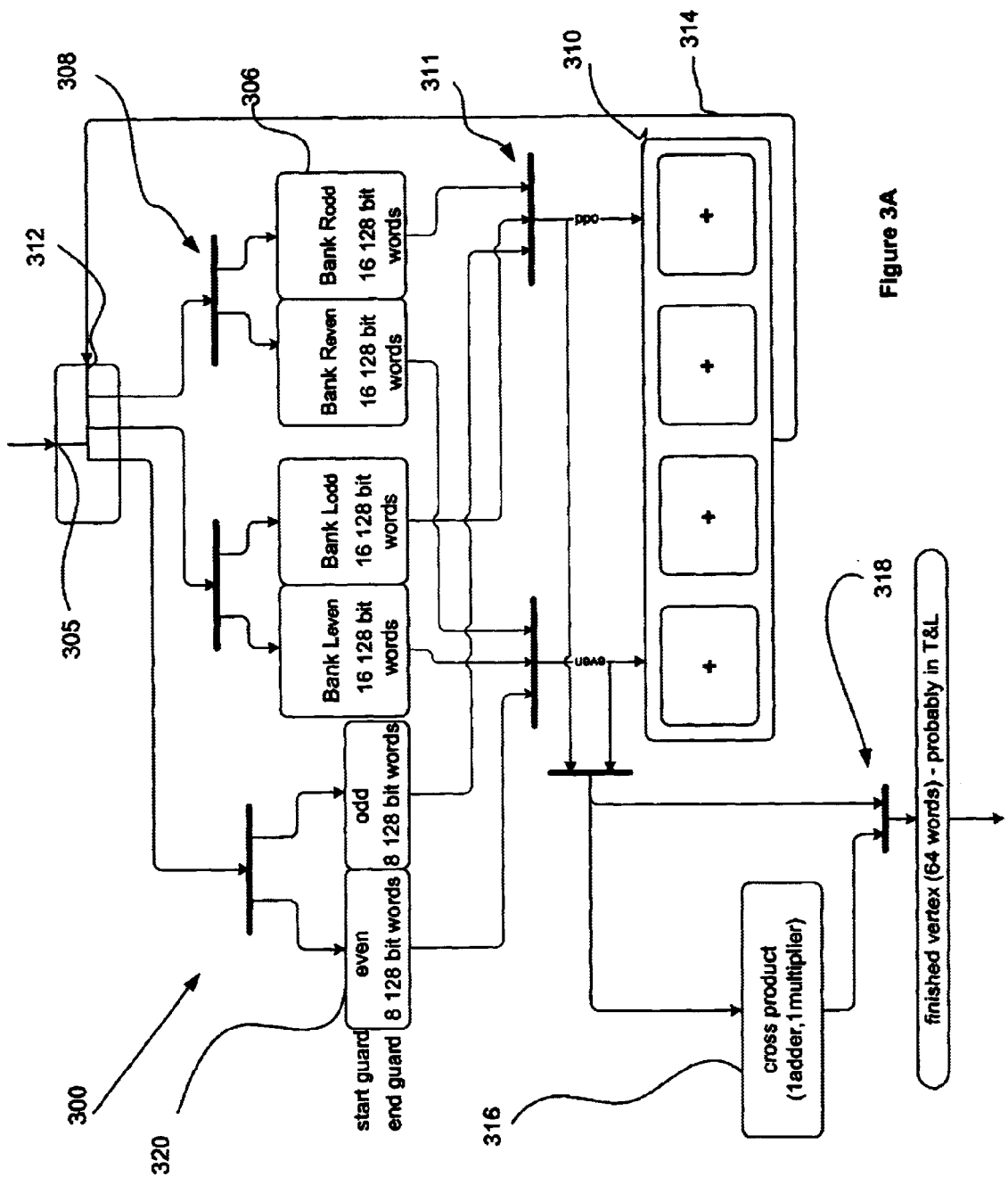
FIG. 3A is a schematic illustrating the forward differencing engine of FIG. 3 in accordance with one embodiment of the present invention.

FIG. 3A is a schematic illustrating one implementation of the forward differencing engine 300 of FIG. 3. As shown, the forward differencing engine 300 includes an input 305 which feeds a plurality of memory banks 306 via a first set of multiplexers 308. The memory banks 306 are coupled to a plurality of adders 310 by way of a second set of multiplexers 311. Coupled to the adders 310 is a plurality of addends 312 which are fed via a feedback loop 314. It should be noted that a cross product module 316 may be optionally coupled between the second set of multiplexers 311 and an output multiplexer 318 in the manner shown in FIG. 3.

For integrating guard curves into the forward differencing procedure, start and end guard curve memory banks 320 are coupled between the input 305 and the second set of multiplexers 311. By this structure, the forward differencing engine 300 is capable of operating on four polynomials in parallel. It should be noted that there is a polynomial for each vertex component, and there may actually be many polynomials active with the parallel adder evaluating four at a time. Normally, the four polynomials evaluated in parallel correspond to x, y, z and w position components or s, t, r and q texture components.

In operation, the forward differencing engine 300 initiates four floating point additions every clock, and stores the result in one of the addends 312. The next level of granularity of operation is the evaluation of a vertex which is permitted to vary polynomially. During use, the memory banks 306 contain the forward difference coefficients corresponding to each of vertex components that are varying. In one embodiment, a 64-bit register (not shown) may be used to program the configuration of the memory banks 306, determine the exact method to evaluate a vertex, specify the destination of each vertex component, and determine the ultimate position of each vertex component within an output vertex (not shown).

Figure 3B:
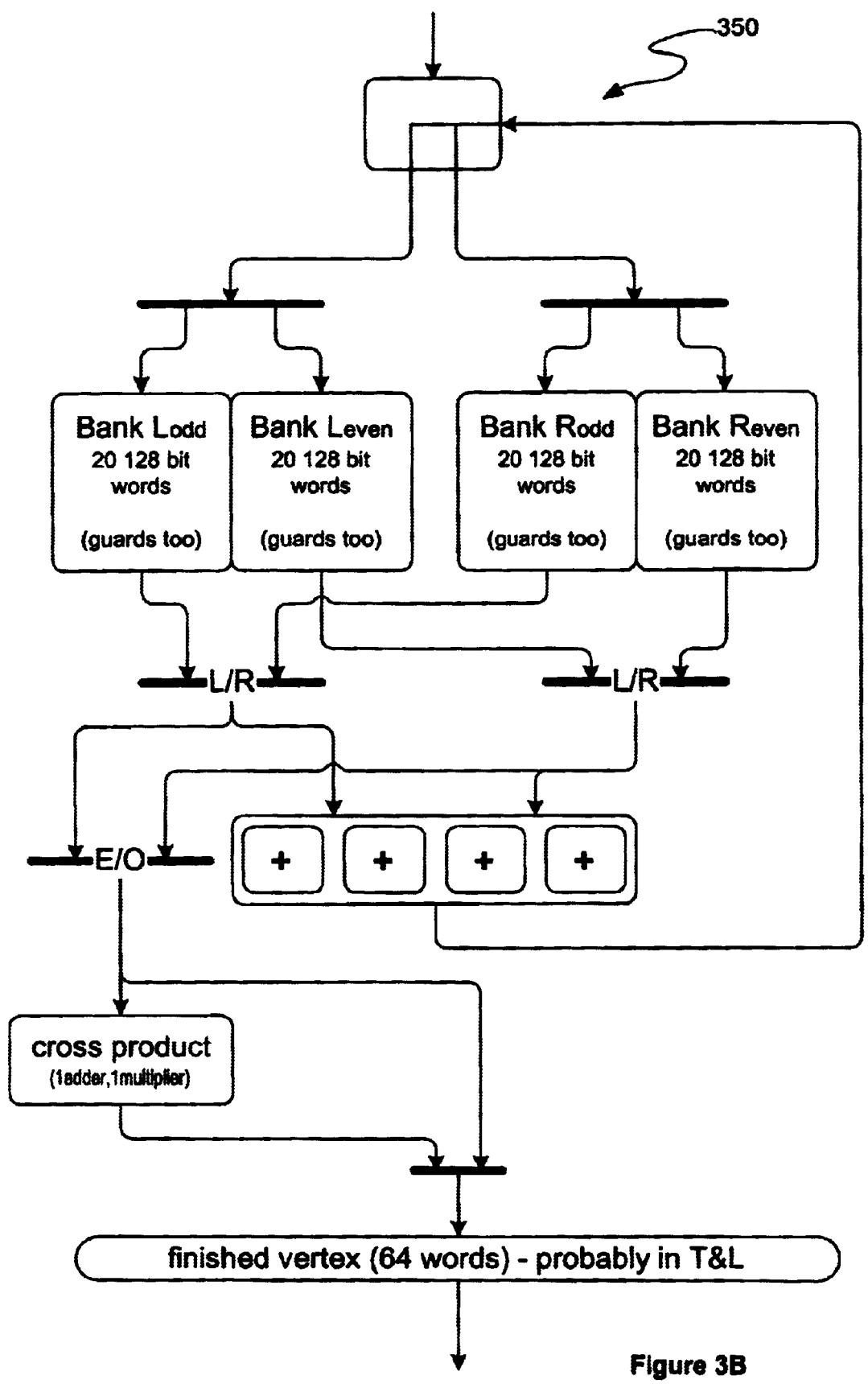
FIG. 3B is a schematic illustrating an alternate forward differencing engine in accordance with another embodiment of the present invention.

FIG. 3B is a schematic illustrating an alternate forward differencing engine 350 which augments the memory banks 306 in lieu of utilizing separate guard curve memory banks 320. It should be noted that any type of hardware implementations may be used in place of those set forth in FIGS. 3 and 3A based on a desired tradeoff between memory access arbitration versus utilizing more memories. One possible modification includes the removal of the cross product module of FIG. 3B.

The forward differencing engines 300 and 350 of FIGS. 3A and 3B are adapted to calculate normal and position values during operation. In various alternate embodiments, other vertex component values, i.e. colors, texture, etc., may be handled by the present invention. Normal values are computed by the forward differencing engine 300 and normalized by a transform and lighting module 301. The normal values are computed by evaluating the parametric partial derivatives of the surface patch, and calculating a cross product thereof. Exemplary pseudo-code for vertex and normal calculation is shown in Table 1 below. It should be noted that in various alternate embodiments, partials need not necessarily be evaluated.

TABLE 1

```
ComputeVertexAndPartials ( ) {
    coefIndex = 0;
    //is the normal present?
    if (ComputeNormal) {
        //write the current partial derivative
        CrossProductPu = Bank [coefIndex] ;
        For (j = 0; j < Degree [0] ; j++) {
            Bank [coefIndex]   += Bank [coefIndex+1] ;
            coefIndex++ ;
        }
        // step past the constant coefficient
        coefIndex++ ;
        //write the other current partial
        CrossProductPv = Bank [coefIndex] ;
        // one lower than first
        For (j = 0; j < Degree [0] -1; j++) {
            Bank [coefIndex]   += Bank [coefIndex+1] ;
            CoefIndex++ ;
        }
        // step past the constant coefficient
        coefIndex++;
        // set so next vertex component is "2nd"
        start = 1;
    } else {
        start = 0;
```

TABLE 1-continued

```
}
//for each possible vertex component
for (i = start; i < NUMBER_OF_COMPONENTS; i++) {
    // write out the current value
    IBuff [IBuffLoc [i]] = Bank [coefIndex] ;
    // compute the new component
    for (j = 0; j < Degree [i] ; j++) {
        Bank [coefIndex] += Bank [coefIndex+1] ;
        coefIndex++ ;
    }
    // step past the constant coefficient
    coefIndex++ ;
}
}
```

Figure 4:
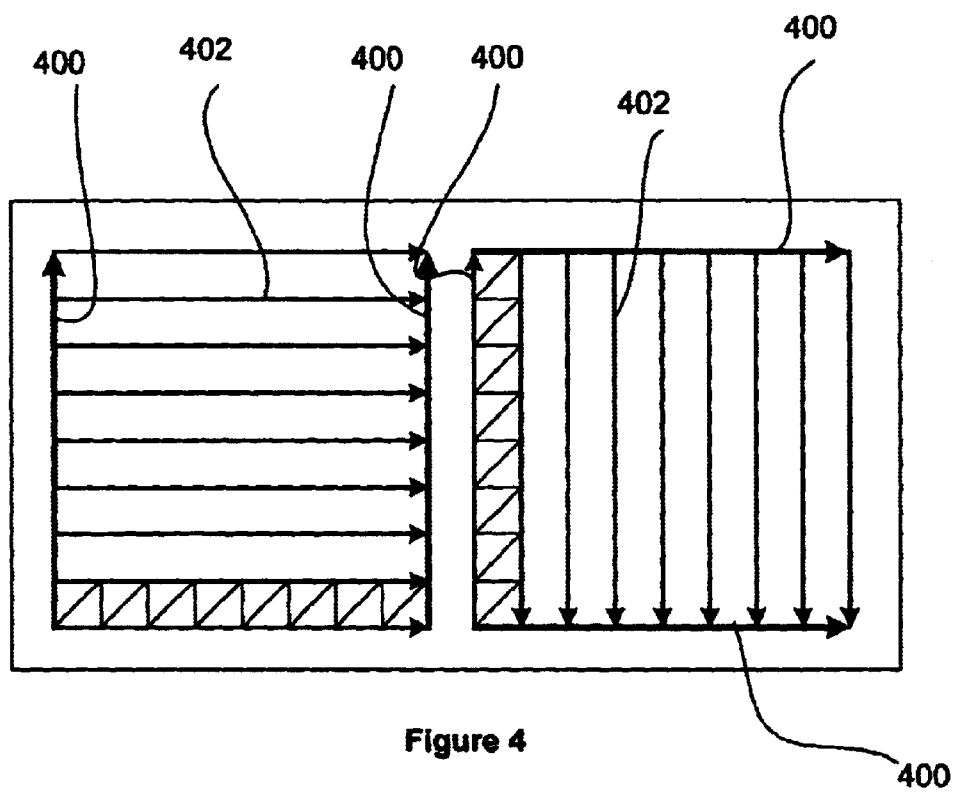
FIG. 4 illustrates the use of guard curves and reversed curves during the decomposition of surface patches in accordance with one embodiment of the present invention.

FIG. 4 illustrates the use of guard curves and reversed curves during the decomposition of surface patches in accordance with one embodiment of the present invention. As shown, guard curves 400 are introduced among the strip curves 402 in order to solve the problems associated with the prior art. It should be noted that the guard curves 400 of the present invention are similar to the strip curves 402 except that they are specifically injected to solve the problems associated with the prior art. In one embodiment, the guard curve 400 is only used to calculate position since differences in other vertex components are generally permitted and/or are less objectionable.

As shown in FIG. 4, the guard curve 400 along the right edge of the left-hand patch is identical to the strip curve 402 along the left edge of the right-hand patch. When a strip is tessellated, the first and last vertex positions of the strip are overwritten by the values computed from the guard curves 400, thus guaranteeing that adjacent tessellations match exactly.

Figure 5:
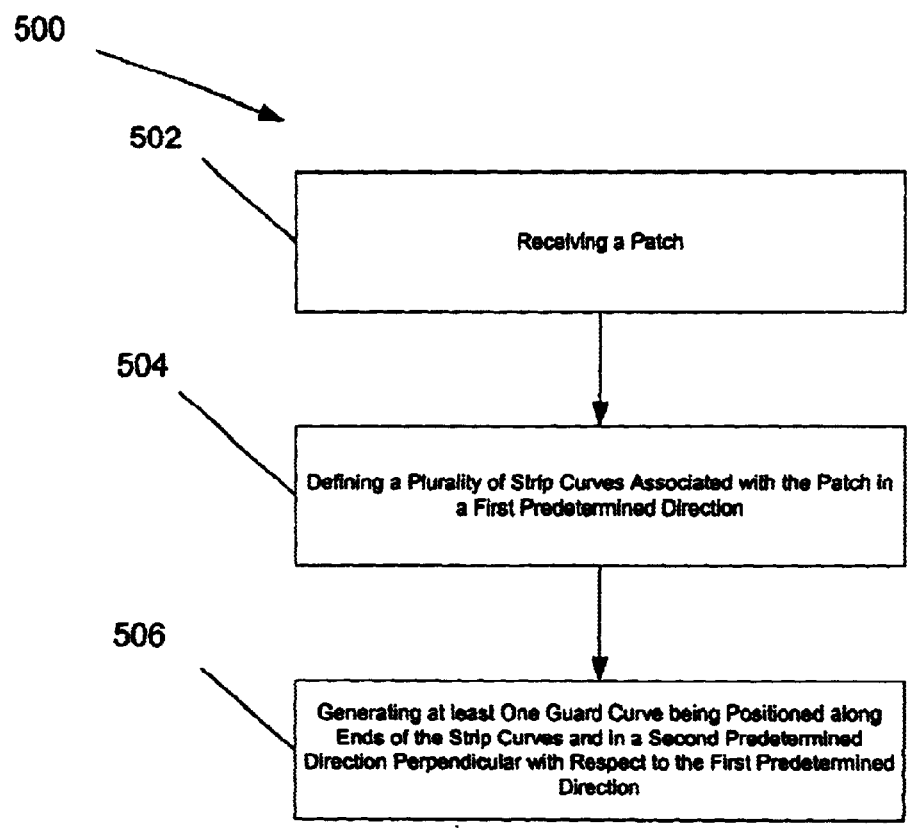
FIG. 5 is a flowchart illustrating a method in which the guard curves of FIG. 4 are generated using the exemplary hardware of FIGS. 3 and 3A.

FIG. 5 is a flowchart illustrating the method 500 in which the guard curves 400 of FIG. 4 are generated using the exemplary hardware of FIGS. 3 and 3A. Initially, in operation 502, a patch is received. Thereafter, a plurality of strip curves 402 associated with the patch is defined in a first predetermined direction. Note operation 504. Using these strip curves 402, areas defined by the strip curves may be decomposed into a plurality of primitives for rendering purposes.

Next, at least one guard curve 400 associated with the patch is generated in operation 506. The guard curve 400 is positioned along ends of the strip curves 402 and in a second predetermined direction which is perpendicular with respect to the first predetermined direction in parameter space. Such guard curve 400 prevents vertex mismatches when tessellating curved surfaces into triangles in the manner set forth during reference to FIG. 4. During some use, two guard curves 400 may be consistently used for each patch, as shown in FIG. 4.

Figure 6:
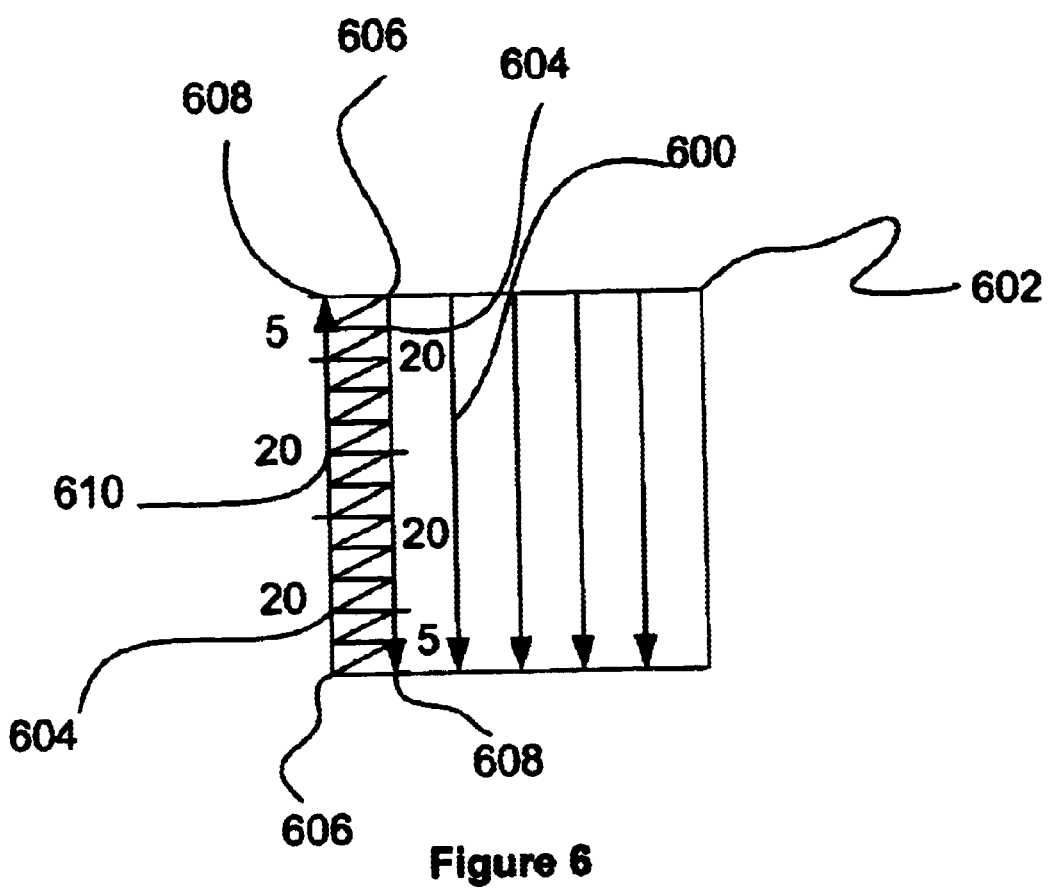
FIG. 6 illustrates a reverse stitching method used in conjunction with the guard curves in accordance with one embodiment of the present invention.

FIG. 6 illustrates a reverse stitching method used in conjunction with the guard curves. During the guard curve method set forth in FIG. 5, a reversed strip curve 610 may be generated in a third predetermined direction parallel and opposite with respect to the first predetermined direction. This is done in order to match the direction of a guard curve or strip curve of an adjacent surface patch. See left edge of right-hand patch of FIG. 4. By doing this, an area defined by the strip curve in the first predetermined direction and the reversed strip curve 610 may then be decomposed using reverse stitching.

As shown in FIG. 6, the reversed strip curve 610 differs from the guard curves of FIG. 4 in that it is not perpendicular to the strip curves. While the guard curves overwrite values already computed by the strip curves, the reversed strip curves directly compute all values/vertex components and no overwriting necessarily occurs.

As shown in FIG. 6, each of the strip curves 600 of the surface patch 602 may be optionally broken up into a plurality of segments 604. It should be noted that a size of the segments 604 are determined based on a size of the vertex memory 302 of the graphics pipeline system. For example, if the vertex memory 302 were capable of handling 20 vertices, the strip curves 600 would be broken up into 20 segments 604. Further, the segments 604 are started at a starting point 606 of the associated evaluation direction of the strip curve 600 such that any fractional segment 604 is positioned adjacent an ending point 608 of the associated evaluation direction. A similar process is executed for the guard curve 610.

In order to afford optimum tessellation, the vertices of the strip curve 600 adjacent to the reversed strip curve 610 are loaded into the vertex memory 302 differently than those of the reversed strip curve 610. In particular, the vertices associated with each of the strip curves 600 are each loaded in a first predetermined order 620. In contrast, the vertices associated with the reversed strip curves 610 are each loaded in a second predetermined order 622. It should be understood that the position and normal values are merged with the strip curves 600 before transform and lighting, and only a single position is transformed.

Figure 7:
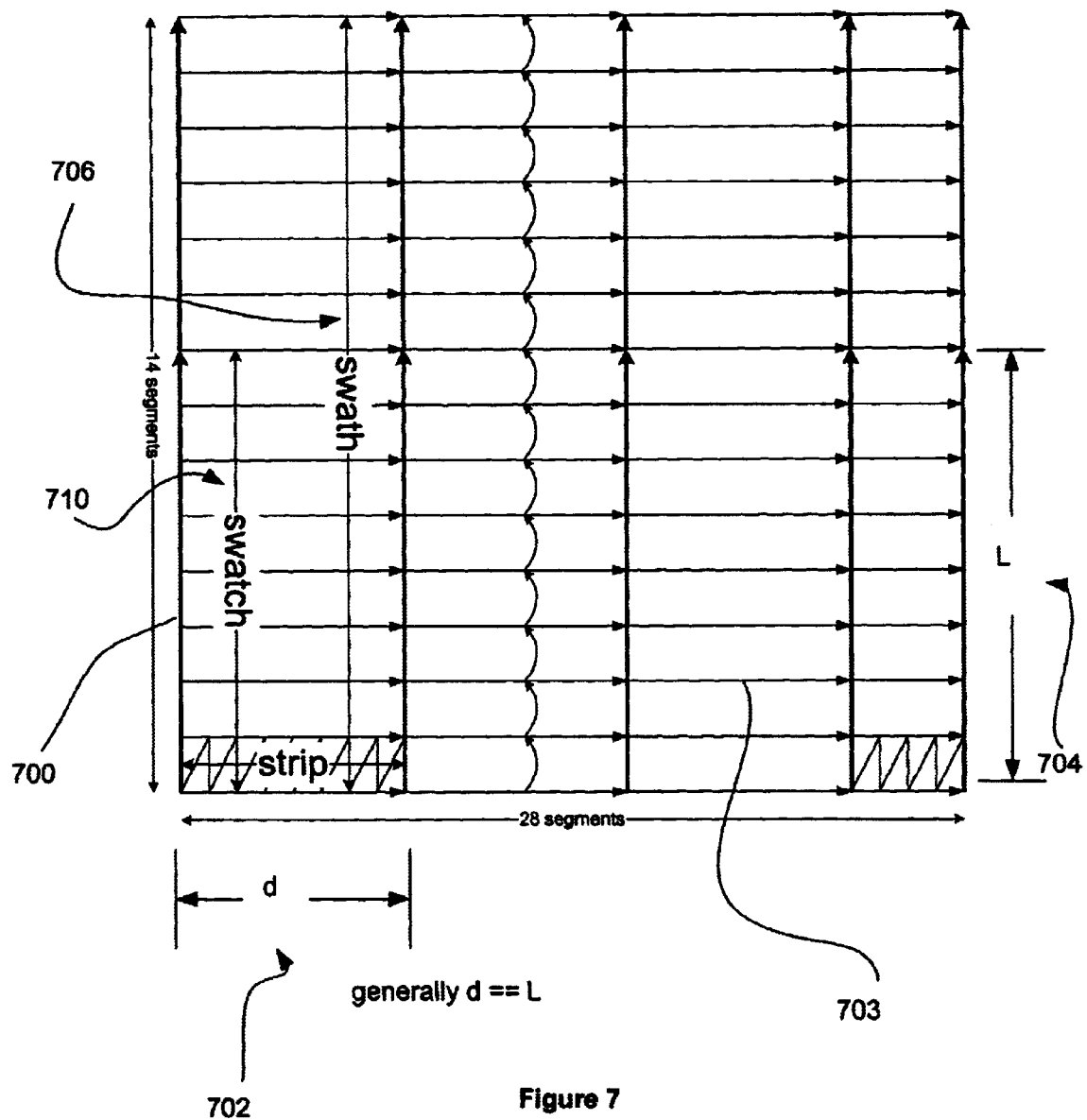
FIG. 7 illustrates the manner in which a length of the guard curves and a space therebetween are set based on a size of the vertex memory.

FIG. 7 illustrates the manner in which a length of the guard curves and a space therebetween are set based on a size of the vertex memory 302. As shown, a plurality of guard curves 700 are generated, and a distance 702 between the guard curves 700 is determined based on a size of a vertex memory 302 into which vertices of the primitives are loaded. In particular, the distance 702 between the guard curves 700 is set such that each vertex of the strip curves 703 fits within the vertex memory 302. In summary, the strip curves 703 are divided up by the guard curves 700 in order to match a size of the vertex memory 302.

Further, a length 704 of the guard curves 700 is determined based on a size of a vertex memory 302 into which vertices of the primitives are loaded. Specifically, the length 704 of the guard curve 700 is set such that each vertex of the guard curve 700 fits within the vertex memory 302. As such, the guard curves 700 are handled in a manner similar to that of the strip curves 703 such that a side of a surface patch may include a plurality of collinear guard curves 700.

The technique set forth in FIG. 7 thus defines multiple "swaths" 706 to accommodate situations where there are more vertices in a row than will fit in the vertex memory 302. In FIG. 7, the patch is rendered in four swaths 706. The coefficients of the strip curves 703 are computed by the host and then evaluated by the forward differencing engine 300. The values at the heads of the strip curves 703 are computed as the result of iteration in the forward differencing engine 300. The values at the tails of the strip curves 703 are computed by the host, likely the result of iterating curve definitions one to the next.

As a result, the values at the heads of the strip curves 703 are not equal to their logical equivalents at the tails of the next strip curve 703. Again, the host may supply a guard curve 700 to evaluate along the start and end of the strip curves 703. It should also be noted that because a guard curve can correspond to a strip curve, a guard curve may only generate as many vertices as can a strip curve. It is this constraint that results in a swath 706 being broken into multiple swatches 710.

Figure 8:
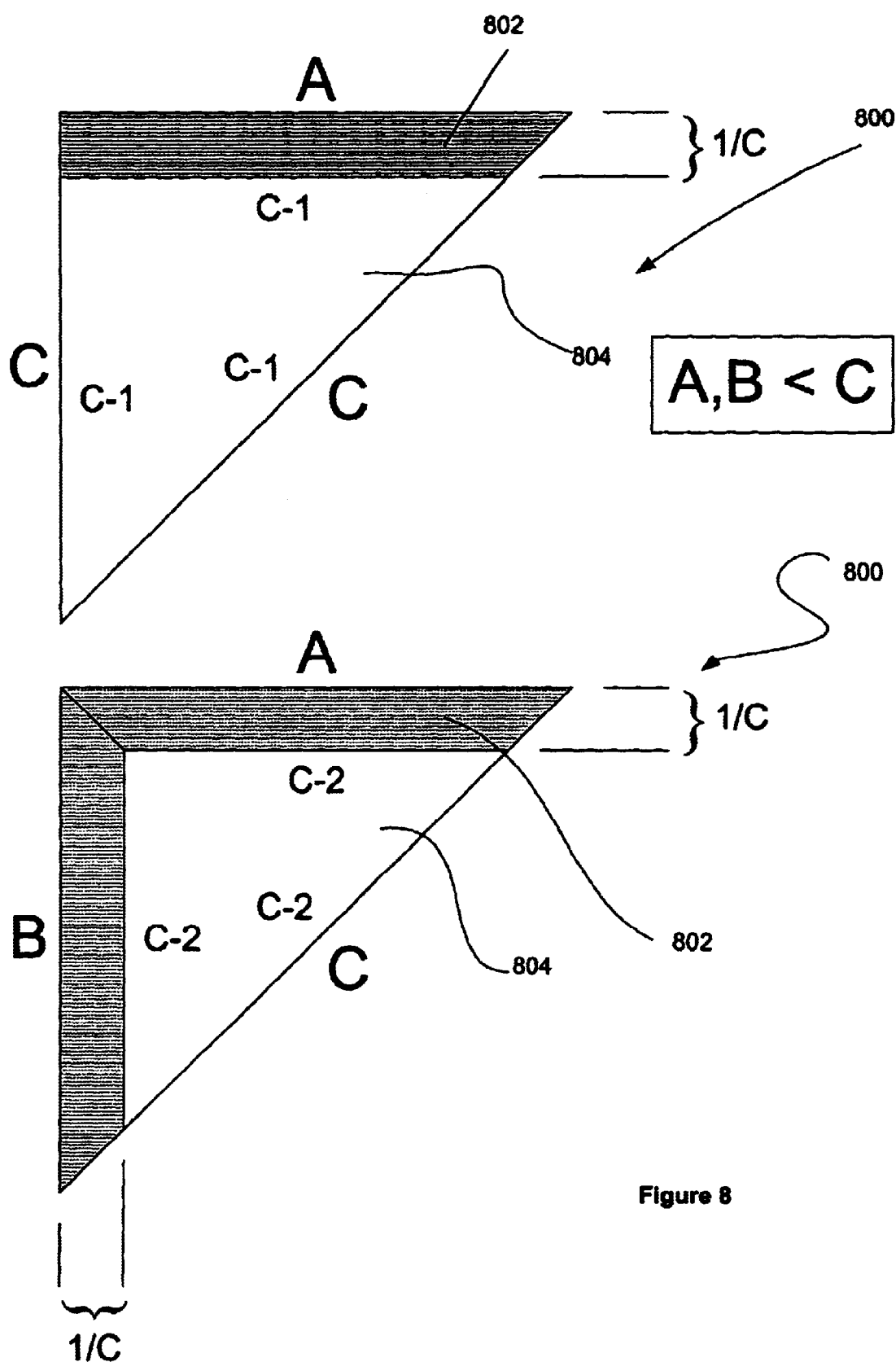
FIGS. 8–10 illustrate the manner in which triangular patches are handled in accordance with one embodiment of the present invention.
Figure 9:
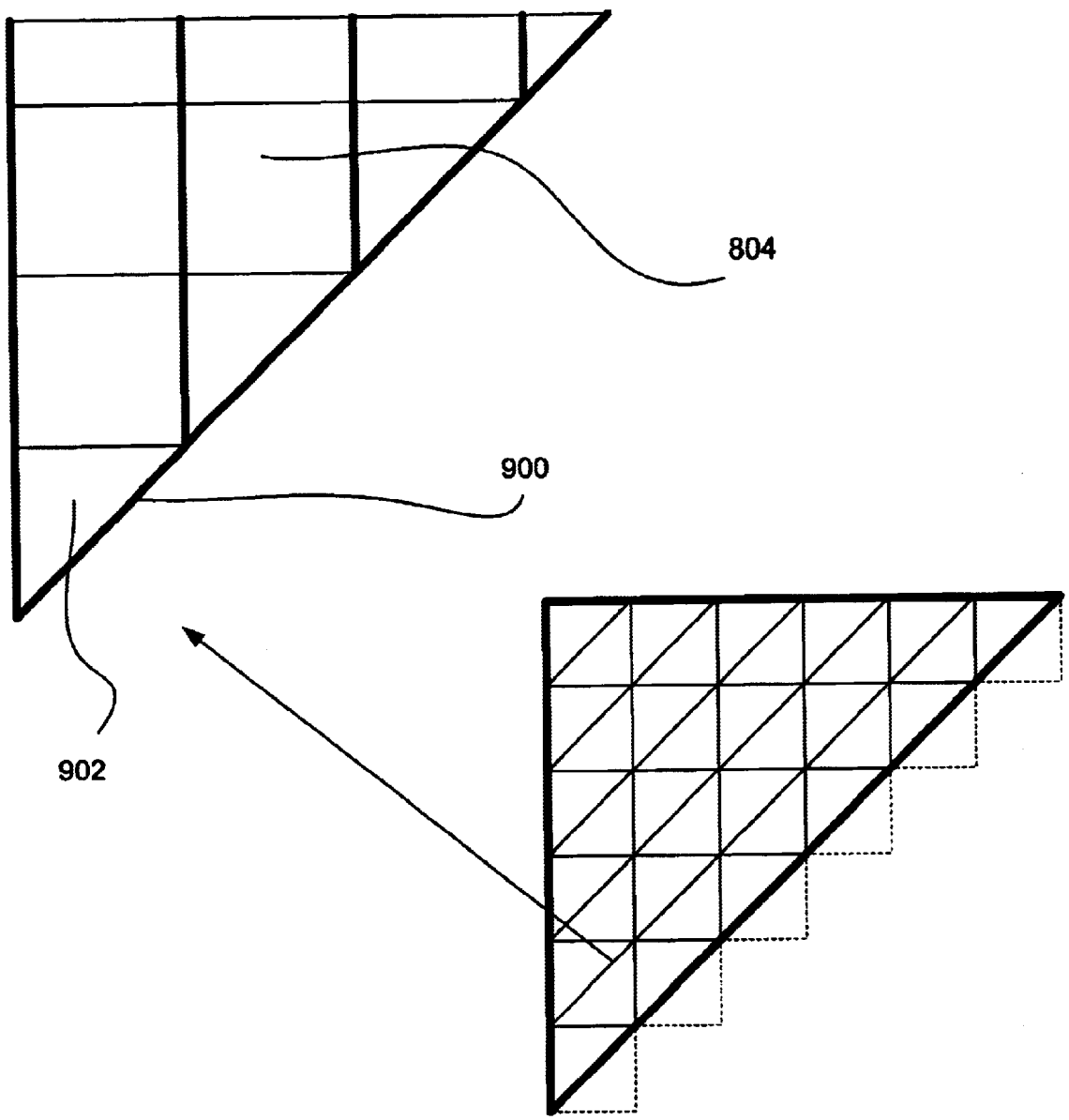
Figure 10:
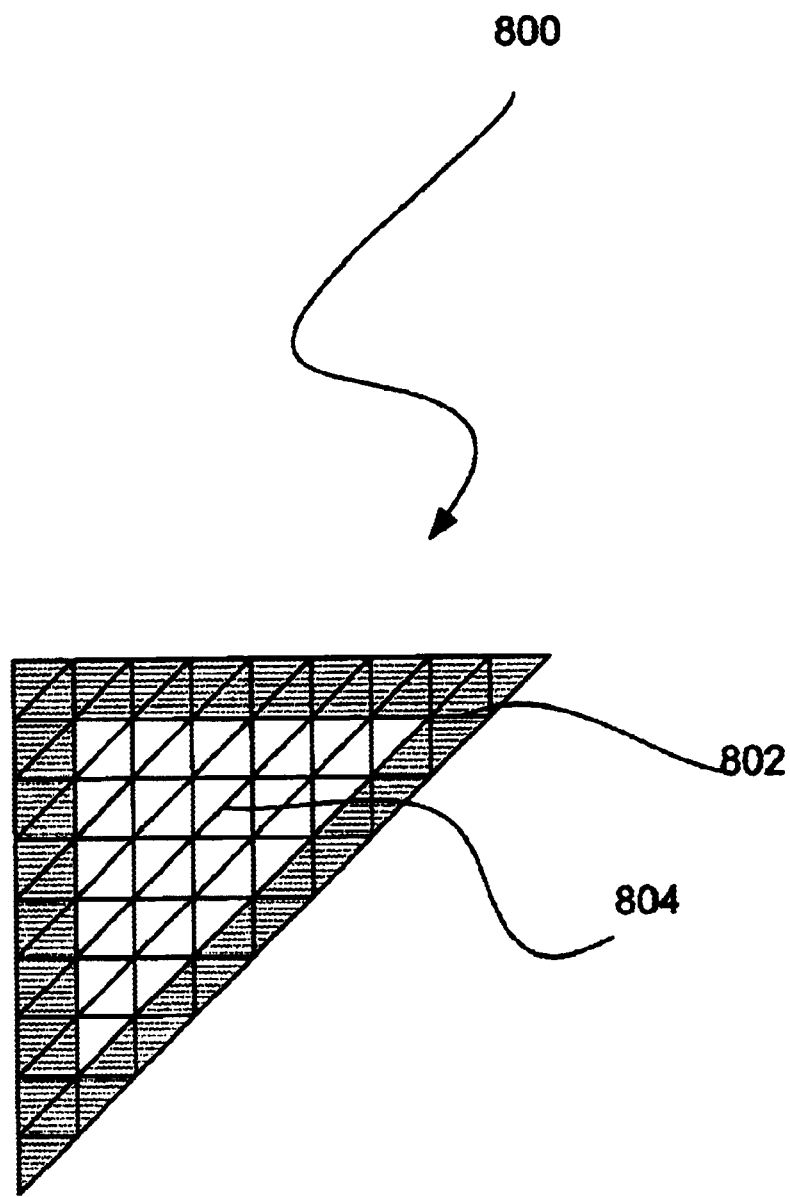

FIGS. 8–10 illustrate the manner in which triangular patches are handled in accordance with one embodiment of the present invention. As shown in FIG. 8, a triangular patch 800 to be rendered may have transition regions 802 defined around an interior region 804. It should be noted that such transition regions 802 may be treated similar to the rectangular patches set forth hereinabove.

FIG. 9 illustrates the manner in which guard curves 900 are configured in and about the inner region 804. As shown, the first swatch in a swath is triangular, and the rest are normal. If a triangular swatch 902 is encountered, an internal counter L is kept for a length of the strip. Such counter L is first initialized to "0." Thereafter, a predetermined number of points (L) are evaluated along the strip. A predetermined number of triangles (2*L−1) are then drawn while skipping the last lower right. An end guard curve is used for point L. The remaining guard curves are incremented a predetermined distance (L) after each strip. FIG. 10 illustrates the triangular patch 800 after processing is complete in accordance with the present embodiment.

The present invention thus uses a consistent direction of edge traversal of a patch by performing the floating-point operations in the same order. This results in the avoidance of pixel dropouts and rendering artifacts. Consistency is required to guarantee the same values are generated for points on an edge shared by two patches that abut. The consistency requirement forces the introduction of additional commands/primitives, and transition regions in patches that would otherwise not require them; a patch with a "reversed" edge requires a transition. The direction of traversal of an edge must be determined from the edge definition itself.

The present invention thus ensures that the floating point calculations are done on the same processor. For example, an Intel® PentiumIII® will not necessarily calculate the same result as computed by the floating point adder of the present invention. In one embodiment, the host may compute forward difference curve coefficients, and the ASIC may evaluate curves and stitch them together. As such, the ASIC may have some, but little, notion of a patch. It should be understood that the calculations may be carried out on any application specific or software-governed hardware per the desires of the user.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for decomposing surfaces using at least one guard curve for rendering purposes during computer graphics processing, comprising:
   receiving a patch;
   defining a plurality of strip curves associated with the patch in a first predetermined direction, wherein areas defined by the strip curves are adapted for being decomposed into a plurality of primitives; and
   generating at least one guard curve associated with the patch, the guard curve being positioned along ends of the strip curves and in a second predetermined direction perpendicular with respect to the first predetermined direction;
   wherein the surfaces are decomposed using the guard curve for rendering purposes.

2. The method as recited in claim 1, wherein the guard curve ensures decomposition of the patch consistent with a curve of an adjacent patch.

3. The method as recited in claim 1, wherein the areas defined by the strip curves are adapted for being decomposed into a plurality of primitives using forward differencing.

4. The method as recited in claim 1, and further comprising generating a reversed curve in a third predetermined direction parallel and opposite with respect to the first predetermined direction.

5. The method as recited in claim 4, and further comprising decomposing an area defined by one of the strip curves in the first predetermined direction and the reversed curve, wherein vertices for the strip curve in the first predetermined direction are loaded into a vertex memory differently with respect to the reversed curve.

6. The method as recited in claim 1, wherein a plurality of guard curves are generated, and a distance between the guard curves is determined based on a size of a vertex memory into which vertices of the primitives are loaded.

7. The method as recited in claim 1, wherein a length of the guard curve is determined based on a size of a vertex memory into which vertices of the primitives are loaded.

8. The method as recited in claim 1, wherein the guard curve includes position values.

9. The method as recited in claim 1, wherein the guard curve includes normal values.

10. A computer program embodied on a computer readable medium for decomposing surfaces using at least one guard curve for rendering purposes during computer graphics processing, comprising:
    a code segment for receiving a patch;
    a code segment for defining a plurality of strip curves associated with the patch in a first predetermined direction, wherein areas defined by the strip curves are adapted for being decomposed into a plurality of primitives; and
    a code segment for generating at least one guard curve associated with the patch, the guard curve being positioned along ends of the strip curves and in a second predetermined direction perpendicular with respect to the first predetermined direction;
    wherein the surfaces are decomposed using the guard curve for rendering purposes.

11. The computer program as recited in claim 10, wherein the guard curve ensures decomposition of the patch consistent with a curve of an adjacent patch.

12. The computer program as recited in claim 10, wherein the areas defined by the strip curves are adapted for being decomposed into a plurality of primitives using forward differencing.

13. The computer program as recited in claim 10, and further comprising a code segment for generating a reversed curve in a third predetermined direction parallel and opposite with respect to the first predetermined direction.

14. The computer program as recited in claim 13, and further comprising a code segment for decomposing an area defined by one of the strip curves in the first predetermined direction and the reversed curve, wherein vertices for the strip curve in the first predetermined direction are loaded into a vertex memory differently with respect to the reversed curve.

15. The computer program as recited in claim 10, wherein a plurality of guard curves is generated, and a distance between the guard curves is determined based on a size of a vertex memory into which vertices of the primitives are loaded.

16. The computer program as recited in claim 10, wherein a length of the guard curve is determined based on a size of a vertex memory into which vertices of the primitives are loaded.

17. The computer program as recited in claim 10, wherein the guard curve includes position values.

18. The computer program as recited in claim 10, wherein the guard curve includes normal values.

19. A system for decomposing surfaces using at least one guard curve for rendering purposes during computer graphics processing, comprising:

logic for receiving a patch;

logic for defining a plurality of strip curves associated with the patch in a first predetermined direction, wherein areas defined by the strip curves are adapted for being decomposed into a plurality of primitives; and logic for generating at least one guard curve associated with the patch, the guard curve being positioned along ends of the strip curves and in a second predetermined direction perpendicular with respect to the first predetermined direction;

wherein the surfaces are decomposed using the guard curve for rendering purposes.

\* \* \* \* \*